Feb. 26, 1946.  M. L. GEORGOPOULOS  2,395,734
STRAW AND MILK CONTAINER COMBINATION
Filed Nov. 12, 1943
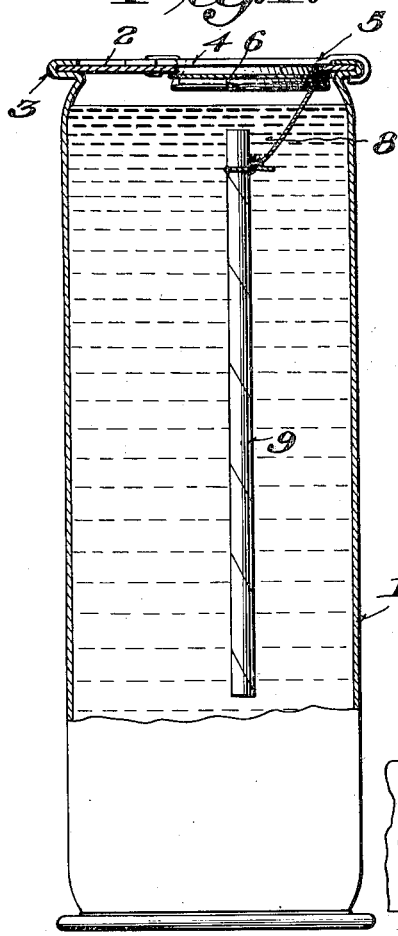
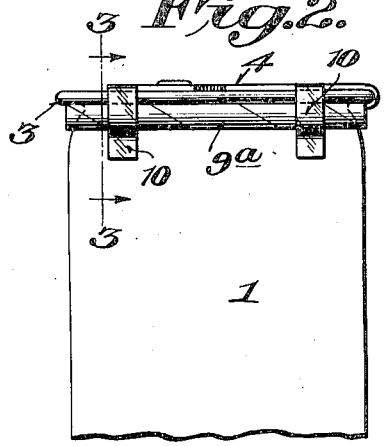
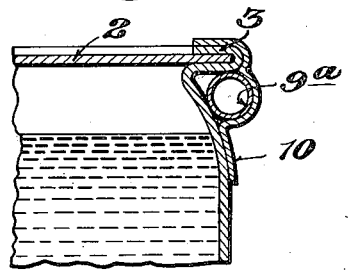
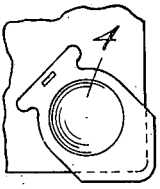
Michael L. Georgopoulos,
By Lester L. Sargent
Attorney Patented Feb. 26, 1946

2,395,734

UNITED STATES PATENT OFFICE 2,395,734

STRAW AND MILK CONTAINER COMBINATION

Michael L. Georgopoulos, Washington, D. C.

Application November 12, 1943, Serial No. 510,020

3 Claims. (Cl. 229—7)

The object of my invention is to provide a novel straw and milk container combination, whereby the straw is attached to the milk container so as to be ready for use by the purchaser; and also to provide a novel modification of the top of a cardboard milk container having a spout whereby the milk may be drunk directly from the container.

In many manufacturing plants and elsewhere milk is supplied in cardboard waxed containers with a hinged lid offset from the center of the top of the container but spaced sufficiently from the edges of the top of the container so that when the user attempts to drink directly from the container, as is usually or often done he will in all likelihood spill some of the milk over his clothing, and also will find it practically impossible to completely empty the container. To avoid this result if a straw is attached to the container he may secure the milk without spilling it, or if the top of the container is provided with a spout of the type shown, it will be possible for the user to drink directly from the spout.

I attain these and other objects of my invention by the means shown in the accompanying drawing, in which—

Figure 1 is a view, partly in vertical section and partly in elevation of a milk container with a straw suspended from the hinged lid of the container;

Fig. 2 is a side elevation of the upper portion of another milk container having a short straw secured exteriorly to and directly under the top rim of the container, but readily detachable therefrom;

Fig. 3 is a section on line 3—3 of Fig. 2;

Fig. 4 is a top plan view of a portion of the top of the milk container, showing the shape and disposition of lid 4.

Like characters of reference indicate like parts on each of the several drawings.

Referring to Fig. 1 of the drawing, there is illustrated a conventional waxed cardboard milk container 1, having a square top 2 and top rim 3. This top has the usual hinged lid 4 normally closing the conventional opening 5 of circular shape, through which the milk is poured. Secured around the circular depressed portion 6 of the lid 4 is a short piece of preferably waxed string 8 which has its free end secured to a suitable straw 9. The straw 9 may be the conventional waxed straw, or may be a relatively short straw, and it may be made of any suitable material which will not be adversely affected by the milk, such as a waxed paper straw, a straw made from grain, or a glass straw. Or the straw may be covered by a wrapping of waxed paper if desired.

In the modification of my invention shown in Fig. 2, a short straw 9a preferably of the same length as the width of the milk container is suitably secured directly under the top rim 3 by suitable means such as the thin strips 10, disposed as shown in Figs. 2 and 3, or by suitably heating the wax of the rim to cause the straw to stick to it.

While my invention is primarily designed for use with waxed cardboard milk containers, it may also be applied to milk bottles having removable caps, by attaching the straw in the same way as shown in Fig. 1 to the cap, or removable lid of the milk bottle.

The device may also be applied to any containers having a large mouth, such as containers for orange juice, orange beverage, pineapple juice, tomato juice, or other containers of that type with a large mouth and cardboard lid.

What I claim is:

1. The combination with a conventional waxed cardboard milk container, of a straw secured directly to the exterior of the container adjacent the top rim of the container, said straw being of a length equal to the width of the side of the container.

2. The combination with a conventional waxed cardboard milk container having a slightly recessed portion below the rim of a straw mounted directly on the exterior of the container adjacent the top rim of the container in the slightly recessed portion of said container below said rim, and gummed strips securing said straw to the container.

3. The combination with a conventional waxed cardboard milk container having a slightly recessed portion below the top rim of the container of a straw mounted directly on and transversely of the exterior of the container adjacent the top rim of the container in the slightly recessed portion of said container below said rim, and means securing said straw to the container.

MICHAEL L. GEORGOPOULOS.